(12) United States Patent
Vukicevic

(10) Patent No.: US 8,499,469 B2
(45) Date of Patent: Aug. 6, 2013

(54) EDGE FINDER

(76) Inventor: Vladimir Vukicevic, Roslyn Heights, NY (US)

( * ) Notice: Subject to any disclaimer, the term of this patent is extended or adjusted under 35 U.S.C. 154(b) by 225 days.

(21) Appl. No.: 13/100,542

(22) Filed: May 4, 2011

(65) Prior Publication Data

US 2012/0279079 A1    Nov. 8, 2012

(51) Int. Cl.
*G01B 5/00* (2006.01)

(52) U.S. Cl.
USPC .............................................. 33/558; 33/642

(58) Field of Classification Search
USPC ................... 33/558, 639, 642, 638, 626, 613, 33/559, 560, 561, 561.1, 561.2
See application file for complete search history.

(56) References Cited

U.S. PATENT DOCUMENTS

| | | | |
|---|---|---|---|
| 1,984,864 A | 12/1934 | Cole et al. | |
| 2,533,198 A | 12/1950 | Radtke | |
| 2,557,029 A | 6/1951 | Griffin | |
| 2,731,726 A * | 1/1956 | Timpner | 33/639 |
| 2,860,418 A * | 11/1958 | Johnson | 33/639 |
| 3,470,618 A * | 10/1969 | Richer | 33/639 |
| 3,985,462 A | 10/1976 | Didato | |
| 3,999,299 A | 12/1976 | Johnson | |
| 4,043,046 A | 8/1977 | Thomas | |
| 4,045,129 A | 8/1977 | Hamar | |
| 4,078,869 A | 3/1978 | Honeycutt | |
| 4,429,463 A | 2/1984 | Angell | |
| 4,438,567 A | 3/1984 | Raiha | |
| 4,566,202 A | 1/1986 | Hamar | |
| 4,622,751 A | 11/1986 | Berg | |
| 5,148,608 A * | 9/1992 | Meller | 33/561 |
| 5,149,608 A | 9/1992 | Deibler | |
| 5,217,336 A | 6/1993 | LeBlanc | |
| 5,245,759 A | 9/1993 | Pearson | |
| 5,276,975 A | 1/1994 | Fisher | |
| 5,358,364 A | 10/1994 | Kall | |
| 5,371,953 A | 12/1994 | Nower et al. | |
| 5,568,265 A | 10/1996 | Matthews | |
| 5,684,578 A | 11/1997 | Nower et al. | |
| 6,050,816 A | 4/2000 | Phoenix et al. | |
| 6,151,788 A | 11/2000 | Cox | |
| 6,606,797 B1 | 8/2003 | Gandy | |
| 6,796,038 B2 | 9/2004 | Humphries | |
| 6,898,860 B2 | 5/2005 | Wu | |
| 6,937,336 B2 | 8/2005 | Garcia et al. | |
| 7,140,118 B2 * | 11/2006 | Adrian | 33/286 |
| 7,464,478 B2 * | 12/2008 | Adrian | 33/286 |
| 2002/0038513 A1 | 4/2002 | Kallesen et al. | |
| 2006/0053643 A1 * | 3/2006 | Adrian | 33/286 |
| 2007/0068020 A1 * | 3/2007 | Adrian | 33/286 |
| 2012/0279079 A1 * | 11/2012 | Vukicevic | 33/558 |

\* cited by examiner

*Primary Examiner* — Yaritza Guadalupe-McCall

(74) *Attorney, Agent, or Firm* — Bechen PLLC

(57) ABSTRACT

An edge finder includes a housing having a power source included therein. The edge finder includes a probe extending outward from a bottom portion of the housing, the probe including a tip portion located at a distal end, a centrally-disposed spherical portion, and a columnar portion located at a proximal end. The edge finder includes a notification element disposed within the housing, the notification element including the ability to be engaged via the power source, such as for example a light source. The edge finder includes a contact element within the housing such that when lateral pressure is applied to the conical portion, the probe rotates about the spherical portion and columnar portion causes the contact element to engage the power source for activating the notification element. Thus, the edge finder is able to determine X, Y, and Z axes of an item using the notification element for guidance.

20 Claims, 6 Drawing Sheets

EDGE FINDER

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The present invention relates generally to edge finding technology and more specifically to an improved apparatus and technique for determining edges in the X, Y and Z plane.

BACKGROUND OF THE INVENTION

When working a piece of material with a milling machine or similar type of work tool, the machinist must first identify a reference or starting point from which the various dimensions and locations for the milling work to be performed on the workpiece will be measured. Failure to properly identify the reference point results in the waste of time and material because of improper milling. Once found, this reference or starting point on the workpiece is then set in corresponding relationship with the centerline of the working part of the milling, drilling, lathe machine or other work tool so that the work will be performed at the correct location. The most common reference point utilized by most machinists is the edge of the workpiece. From the edge of the workpiece, dimensions are utilized to properly position the workpiece under the machine so that the work operation is performed at the desired location.

A common method utilized to find an edge of a workpiece is generally referred to as the contact or bump method. In this method, a simple piece of round stock is placed in the mill spindle and the work tool is hand cranked to gently abut the edge of the workpiece against the round stock. To align the work machine with the edge of the workpiece, the machinist then raises the round stock above the workpiece and moves the workpiece over half the diameter of the round stock. The micrometer dial setting at this position is zeroed to correspond to the edge of the workpiece, thereby aligning the work tool (i.e., the spindle centerline) with the plane running through the edge of the workpiece. Although the contact or bump method is quick and simple, it is well known that it is generally not accurate due to the inherent problems associated with trying to recognize when the contact occurs and the elasticity of the materials involved. In addition to the inherent accuracy problems, it is not uncommon for machinists, particularly relatively inexperienced or hurried machinists, to forget to take into account the one-half of the diameter of the round stock used as the edge finder. Another problem is that too much contact against the workpiece can dent or otherwise damage the workpiece. Moreover, this method is not intended or useful for finding the Z-plane edge of a workpiece.

Another technique uses a tool commonly known as a wiggler. Most wiggler sets come with an edge finder component that has a generally mushroom-shaped disk contact at the end of the wiggle shank opposite that which fits into the collet, typically in a ball-and-socket type of arrangement. As with the contact technique, the workpiece is moved towards the spinning edge finder until it gently touches the disk contact and steadies the wiggling. The workpiece is then slowly dialed further towards the edge finder until it is spinning true (i.e., no wiggle). At the point the edge finder starts to slip sideways from the drag of the spinning disk against the workpiece, the machinist has found the edge of the workpiece. As with the contact method, the machinist then raises the edge finder and dials in half of its diameter, typically 0.100 inches, to align the spindle centerline with the edge plane of the workpiece. Although the wiggler edge finder is generally considered to be accurate for routine machine work and good enough for most precision work, it is known to be frustrating to utilize due to the fact that it has to be reset for each edge contact, requires additional calculation, and may damage a workpiece. The wiggler device is not configured or useful for finding the Z-plane edge of a workpiece.

Another well known mechanical edge finder utilizes a spring loaded conical disc that spins while free of the workpiece and then suddenly kicks or slips sideways when contact with the edge of the workpiece is obtained. Unlike the wiggler edge finder, however, the disc of this type of edge finder only slips a certain amount and then goes no further. As a result, the machinist can back up and try again without having to reset the contact by hand. Once the edge is found, the machinist moves the workpiece, generally by moving the mill table, over one-half the diameter of the edge finder to align the spindle axis with the plane of the workpiece edge. This type of device is less precise and may damage a workpiece, as well failing to find the Z-plane edge of a workpiece.

A number of prior art edge finders are described in issued patents. For instance, U.S. Pat. No. 3,999,299 to Johnson describes an edge finder having a housing adapted to be received by the chuck on a work tool spindle, a slide biased against the housing by a spring that permits lateral movement of the slide and an outwardly extending finger that is rotatably attached to the slide at one end and shaped with a flat face at the other end to engage the side or edge of the workpiece. The plane of the flat face is configured to be in alignment with the axis of the work tool. Like the prior art devices set forth above, the workpiece is moved towards the edge finder until the edge is brought into contact with the flat face, at which time the slide moves at a right angle to the direction the workpiece is traveling indicating alignment with the edge. Unlike the above devices, however, no measurement adjustment is required. But the movement and device-specific ball-bearing friction results in a loss of precision. This type of device is not configured or useful for finding the Z-plane edge of a workpiece.

U.S. Pat. No. 5,217,336 to LeBlanc discloses an edge finder having an elongated body with a push pin at the semi-circular cross-section lower end that is contacted by the edge of the workpiece to operatively engage a lever connected to a dial indicator. The plane of the flat side of the lower end, which comes into contact with the workpiece edge when the pin is fully engaged, is in alignment with the axis of the spindle, thereby eliminating the need to factor in an adjustment. This device requires significant set-up and is prone to machinist error—particularly in cases of inexperience and hurriedness—making the device highly impractical. This type of device is not configured or useful for finding the Z-plane edge of a workpiece.

U.S. Pat. No. 4,429,463 to Angell discloses an electro-mechanical datum point locator tool that utilizes a cylindrical tip assembly that has an electrically conductive sleeve which causes a light to be emitted from the circumference of the tool's cylindrical housing when contact with the edge of the workpiece is obtained. The machinist must adjust for one-half the diameter of the tool's tip and requires the workpiece to be made of a conductive material—eliminating a large number of highly popular work materials. This type of device is not configured or useful for finding the Z-plane edge of a workpiece.

U.S. Pat. No. 5,276,975 to Fisher describes an audible-visual edge finder having a working end member at the end of a cylindrical shank. The working end member has a flat that is configured to make an audible sound when it contacts the workpiece and to cause the finder to vibrate radially, thereby enhancing the sideways jump, to visually signal contact with the workpiece. Like the above technique, the machinist must adjust for one-half the diameter of the working end member. This type of device is not configured or useful for finding the Z-plane edge of a workpiece.

U.S. Pat. No. 7,140,118 to Adrian describes an edge finding device that utilizes a downward-facing beam of light to visually locate the edge of a workpiece. The finder eliminates the need for calculations to find the edge and the risk of contact damage to the workpiece or precision tool. The device suffers from inaccuracy due to light dispersion when locating and touching the edge of the workpiece. It is also significantly more expensive to produce when compared to commonly used mechanical edge finding devices. This type of device is not configured or useful for finding the Z-plane edge of a workpiece.

As such, there exists a need for an edge finder that overcomes the limitations of the prior techniques, as well as accounting for Z axis measurements.

SUMMARY OF THE INVENTION

An edge finder includes a housing having a power source included therein. The edge finder includes a probe extending outward from a bottom portion of the housing, the probe including a tip portion located at a distal end, a centrally-disposed spherical portion, and a columnar portion located at a proximal end. The edge finder includes a notification element disposed within the housing, the notification element including the ability to be engaged via the power source, such as for example a light source. The edge finder includes a contact element within the housing such that when lateral pressure is applied to the conical portion, the probe rotates about the spherical portion and columnar portion causes the contact element to engage the power source for activating the notification element. Thus, the edge finder is able to determine X, Y, and Z axes of an item using the notification element for guidance.

In one embodiment, the edge finder determines X axis and/or Y axis based on the assertion of a pressure perpendicular to a centerline of the housing. The pressure causes the vertical displacement of the contact element allowing for the compression of a spring and thus electrically connecting the notification element and the power source. In another embodiment, the edge finder determines the Z axis based on the assertion of a pressure parallel to the centerline of the housing. This pressure also causes the vertical displacement of the contact element within the housing thus electrically connecting the notification element and the power source.

The edge finder solves technical problems faced during precise milling, drilling, cutting, sanding, knurling, or other work with metal, wood, plastic, and other industrial materials by enabling various benefits. Those benefits include: precise and direct edge-finding for a workpiece in the horizontal plane (e.g. Edge 0X and Edge 0Y of a workpiece) with no additional calculation or adjustment; precise edge-finding for a workpiece in the vertical plane through the calculation of distance Z, i.e. indirectly finding Plane 0XY; edge-finding for a workpiece made from any sort material, regardless of the electro-conductive nature of the manufactured workpiece material because of the independent electrical-loop inherent in the design; precise and comfortable edge-finding of the above-mentioned edges due to the motor-visual relationship of the worker/operator and the edge finder, i.e. feedback—due to the inherent design of the edge finder; and the entire edge-finding process to be conducted without the rotation of the edge finder, thus eliminating the potential for strain or damage and conserving electrical energy that results from rotation. Additionally, the edge finder of the present invention allows for a user to approach a workpiece from any direction without risk of damage to the edge finder based on the shape of the probe.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

In the following description, reference is made to the accompanying drawings that form a part hereof, and in which is shown by way of illustration specific embodiments in which the invention may be practiced. It is to be understood that other embodiments may be utilized and design changes may be made without departing from the scope of the present invention.

Figure 1:
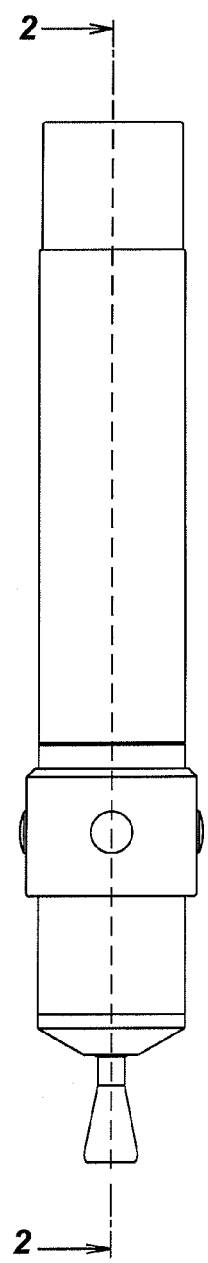
FIG. 1 illustrates an external perspective view of an edge finder.
Figure 2:
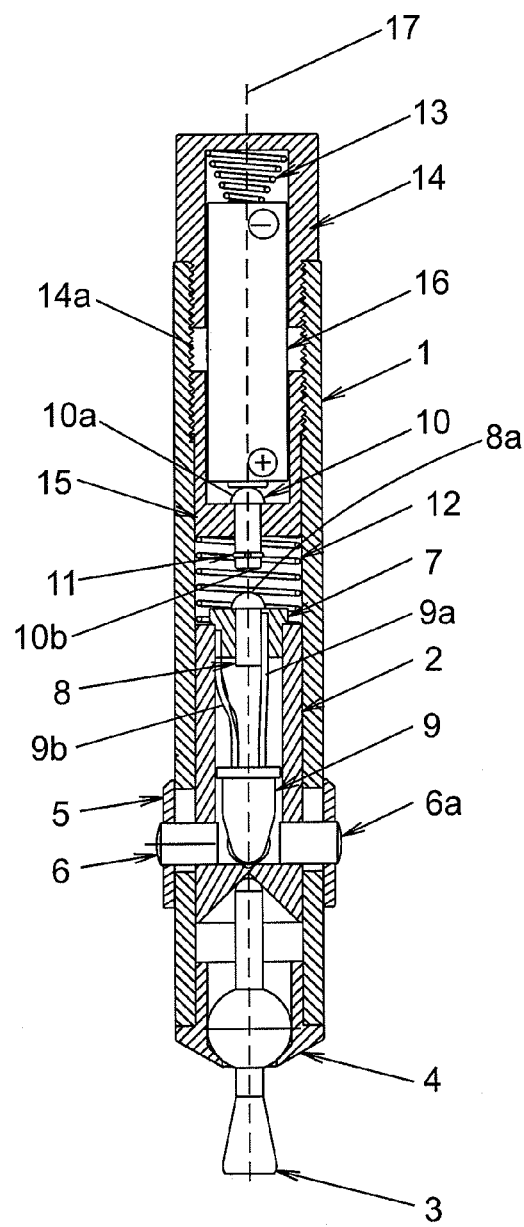
FIG. 2 illustrates a cross-section view of the edge finder.

FIG. 1 illustrates a front view of one embodiment of the edge finder of the present invention. The edge finder includes numerous elements, as better illustrated via the cross-sectional line of FIG. 2. Therefore, FIG. 2 illustrates the cross-sectional view of the edge finder.

The edge finder includes a probe 3 extending from housing 4. The probe 3 includes a tip portion at a distal end, spherical portion in the central portion and a columnar portion at a proximal end. The tip portion extends outward and as described in further detail below, rotates about outside of the housing based on the spherical portion for movement of the columnar portion. Above the probe is a plurality of openings 5 with transparent lenses 6. The edge finder includes a plug 7 and contact pin 8. Beneath the plug 7 and contact pin 8 is a notification element, which in this illustrated embodiment is an LED light 9.

The edge finder further includes a contact element, in this illustrated embodiment being a contact pin 10, with a top edge 10a and a bottom edge 10b. At the bottom of the contact pin 10 is a c-clip 11. The edge finder further includes a cone shaped spring 13, a cap 14 with threading 14a, engaging a housing 15. Enclosed therein is a power source (battery) 16. Moreover, as illustrated, the edge finder includes the central axis 17.

Figure 3:
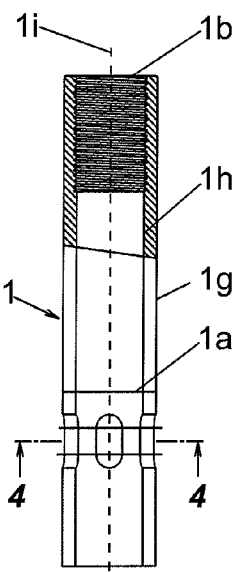
FIG. 3 illustrates a partial cross-section view of a cylinder.

The operations of the edge finder 1 are described in further detail below, wherein further discussion of the figures provides additional context to the operations. For example, FIG. 3 illustrates a cross-section of a portion of the cylinder of the edge finder 1. The cross-section across the mid-section line 17 illustrates a permanent line 1a of the cylinder, threads 1b, the exterior surface 1g and the interior cylindrical surface 1h.

Figure 4:
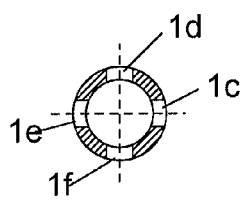
FIG. 4 illustrates another cross-section view of the cylinder.

FIG. 4 illustrates a cross-sectional view of a portion of the cylinder across cross-section 4-4 of FIG. 3. Illustrated in the cross-section are four windows 1c, 1d, 1e and 1f. It is recognized that the cross-section illustrates four windows, but the edge finder 1 is not expressly limited to four windows, but that any suitable number of windows may be utilized herewith for functionality described herein. In another embodiment, the housing may include a completely visible portion, such as for example a portion of the housing itself being composed of a translucent material and is not expressly limited to discrete window portions.

Figure 5:
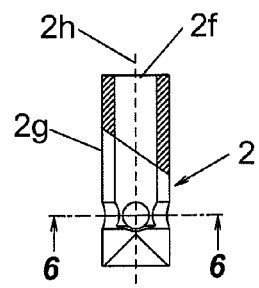
FIG. 5 illustrates a partial cross-section of the cylinder exposing the piston assembly.

FIG. 5 illustrates cut-away view of a portion of a piston 2, including opening 2f, exterior cylindrical surface 2g relative to centerline 17. Moreover, the piston is further illustrated in FIG. 6 in cross-section 6-6 with openings 2b, 2c, 2d and 2e. It is recognized that the cross-section illustrates four openings, but the edge finder 1 is not expressly limited to four openings, but that any suitable number of openings may be utilized herewith for functionality described herein including for example a completely translucent portion. In the illustrated embodiment, the number of openings corresponds with the number of windows (e.g. 1c, 1d, 1e and 1f of FIG. 4). FIG. 7 illustrates the cone-shaped opening 2a of the piston 2.

Figure 8:
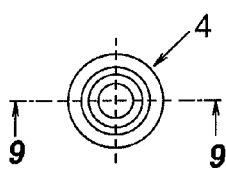
FIG. 8 illustrates a housing assembly.
Figure 9:
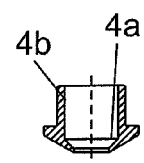
FIG. 9 illustrates a cross-sectional view of the housing assembly.

FIG. 8 illustrates a top view of the housing 4, with a cross-section 9-9. FIG. 9 illustrates the housing along the cross-section 9, including the cone-shaped front portion 4a and the cylindrical surface 4b, including the outer flange portion.

Figure 10:
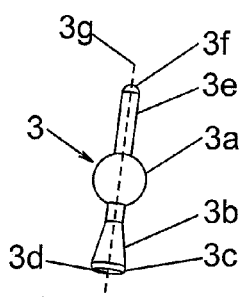
FIG. 10 illustrates an isometric perspective view of a probe.

FIG. 10 illustrates a perspective view of the probe 3, including a ball-shaped portion 3a, with cone-shaped portion 3b with a rounded surface 3c that becomes a flat surface 3d. A top elongated portion 3e ending with a half-spherical portion 3f relative to the central axis 3g.

Figure 11:
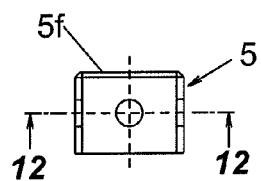
FIG. 11 illustrates a visual ring.
Figure 12:
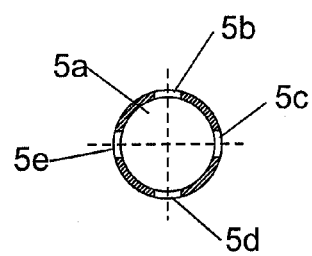
FIG. 12 illustrates a cross-sectional view of the visual ring.

FIG. 11 illustrates a side view of the visual ring 5 with a top portion 5f. FIG. 11 further includes a cross-section 12-12, visible in FIG. 12. FIG. 12 illustrates the top-down view along cross section 12-12. The cross-section illustrates the center portion 5a, as well as the openings 5b, 5c, 5d and 5e. It is recognized that the cross-section illustrates four openings, but the edge finder 1 is not expressly limited to four openings, but that any suitable number of openings may be utilized herewith for functionality described herein or may include a transparent continuous ring instead of windows.

At the bottom section of cylinder 1 inserted is housing 4 shown in FIG. 8 and FIG. 9, in which is placed the light probe 3 shown in FIG. 10. Probe 3 has a particular shape. The middle section of probe 3 is ball-shaped 3a; the bottom section is cone-shaped 3b with a rounded surface 3c that becomes flat-shaped surface 3d; the top section begins with the elongation 3e which ends with the half-spherical 3f located in the cone-shaped opening 2a from piston 2. Between the ball-shaped 3a of probe 3 and cylindrical surface 4b of housing 4 there is minimal clearance, for example in one embodiment the clearance may be, but is not expressly limited to, between 0.005 and 0.01 mm. At the same time, ball-shaped 3a of probe 3 falls into cone-shaped 4a of housing 4.

Figure 6:
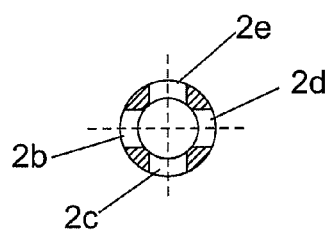
FIG. 6 illustrates a cross-section view of the piston.
Figure 7:
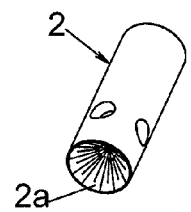
FIG. 7 illustrates an isometric perspective view of the piston.

In the central section of cylinder 1 placed is piston 2 shown in FIG. 5, FIG. 6, and FIG. 7, which is manufactured from an electro-conductive material, i.e. steel. Between the interior cylindrical surface 1h of cylinder 1 and the exterior cylindrical surface 2g of piston 2 there is minimal clearance so that piston 2 can slide inside cylinder 1. The bottom section of piston 2 has a cone-shaped opening 2a, and openings 2b, 2c, 2d, and 2e each positioned at horizontal 90-degree angles from each other, connected through opening 2f. In opening 2f of piston 2, located is the light 9, which in this embodiment is an LED, as illustrated in FIG. 2.

At the top section of piston 2 in opening 2f, plug 7 is fitted therein, as shown in FIG. 2. In this embodiment, the plug 7 is manufactured from a non-conductive material. Plug 7 engages contact the pin 8, shown in FIG. 2, which is also manufactured from an electro-conductive material. Positive pole 9a of the LED light 9 is connected with the contact pin 8 while the negative pole 9b of the LED light 9 is connected with the piston 2 in opening 2f.

The visual ring 5 is located at the exterior cylindrical surface 1g, as noted in FIGS. 11 and 12. Between the interior surface 5a of the visual ring 5 and the exterior cylindrical surface 1g of cylinder 1 there is minimal clearance so that the visual ring 5 can slide along cylinder 1, for example in one embodiment the clearance may be, but is not expressly limited to, between 0.005 and 0.01 mm. As noted above, in this embodiment, the visual ring 5 has four openings 5b, 5c, 5d, and 5e each positioned at horizontal 90-degree angles from each other.

In this embodiment, semi-transparent lenses 6, 6a, 6b and 6c are disposed in the visual ring openings 5b, 5c, 5d, and 5e and the piston 2 openings 2b, 2c, 2d, and 2e. The lenses 6, 6a, 6b, and 6c connect piston 2 with the visual ring 5. In this embodiment, there is minimal clearance between the lenses 6, 6a, 6b, and 6c and windows 1c, 1d, 1e, and 1f of cylinder 1, for example in one embodiment the clearance may be, but is not expressly limited to, between 0.005 and 0.01 mm.

In this embodiment, the piston 2, along with lenses 6, 6a, 6b, and 6c, visual ring 5, LED light 9, plug 7, and contact pin 8 represent one whole so that when piston 2 moves up and down in cylinder 1, the whole moves in unison.

A spring member, in this illustrated embodiment being a compression cylindrical spring, 12 is located above the piston 2, as illustrated in FIG. 2, wherein the top section rests against the housing 15 and thus pushes the piston 2 downward in the direction of the half-spherical portion 3f of probe 3. Along with this, probe 3 is pressed downward and with the ball-shaped portion 3a presses onto the cone-shaped portion 4a of housing 4. Because of this interaction, the central axis of 3g of probe 3, along with the central axis of 2h of piston 2, along with the central axis of 1i of cylinder 1, are all in co-linear position with axis 17 of the edge finder, shown in FIG. 2.

Moreover, the bottom portion of the piston 2 provides the engagement surface for columnar portion of the probe to engage against.

Cap 14 is located on the top section of the cylinder 1. The cylinder 1 and the cap 14 is engaged, in this embodiment, using the carved thread 1b of cylinder 1 and thread 14a of cap 14. The cap 14 is manufactured from and electro-conductive material. The cone-shaped spring 13 placed in the cap 14 is also manufactured from an electro-conductive material. In this embodiment, the cone-shaped spring 13 presses against the battery 16 in the direction of the contact pin 10. This engagement creates an electrical contact between the negative pole of the battery 16 and the whole of cap 14, cylinder 1, piston 2, and the negative pole 9b of the LED light.

The battery 16 and contact pin 10 are placed in the housing 15, which is manufactured from a non-conductive material. In one embodiment, housing 15 has thread 15a on its outer surface area. Through thread 15a, housing 15 is connected with thread 1b of cylinder 1, as illustrated in FIG. 2.

Between the contact pin 10 and the housing 15, there exists minimal clearance so that the contact pin 10 can slide vertically, up and down, for example in one embodiment the clearance may be, but is not expressly limited to, between 0.005 and 0.01 mm. The c-clip 11 is located at the bottom section of contact pin 10, preventing contact pin 10 from falling out during battery 16 replacement.

Wherein the above describes at least one embodiment of the elements and construction of the edge finder, FIGS. 13-16 illustrates operations embodiments of the edge finder. FIG. 13a and FIG. 13b depict the position of the edge finder in relation to workpiece 20, having edges 0X, 0Y, and 0Z perpendicular to each other. When workpiece 20 is placed within a work tool, e.g. milling machine, workpiece 20 can move in one of these three directions: X, Y, or Z.

Figures 14A, 14B, 14C:
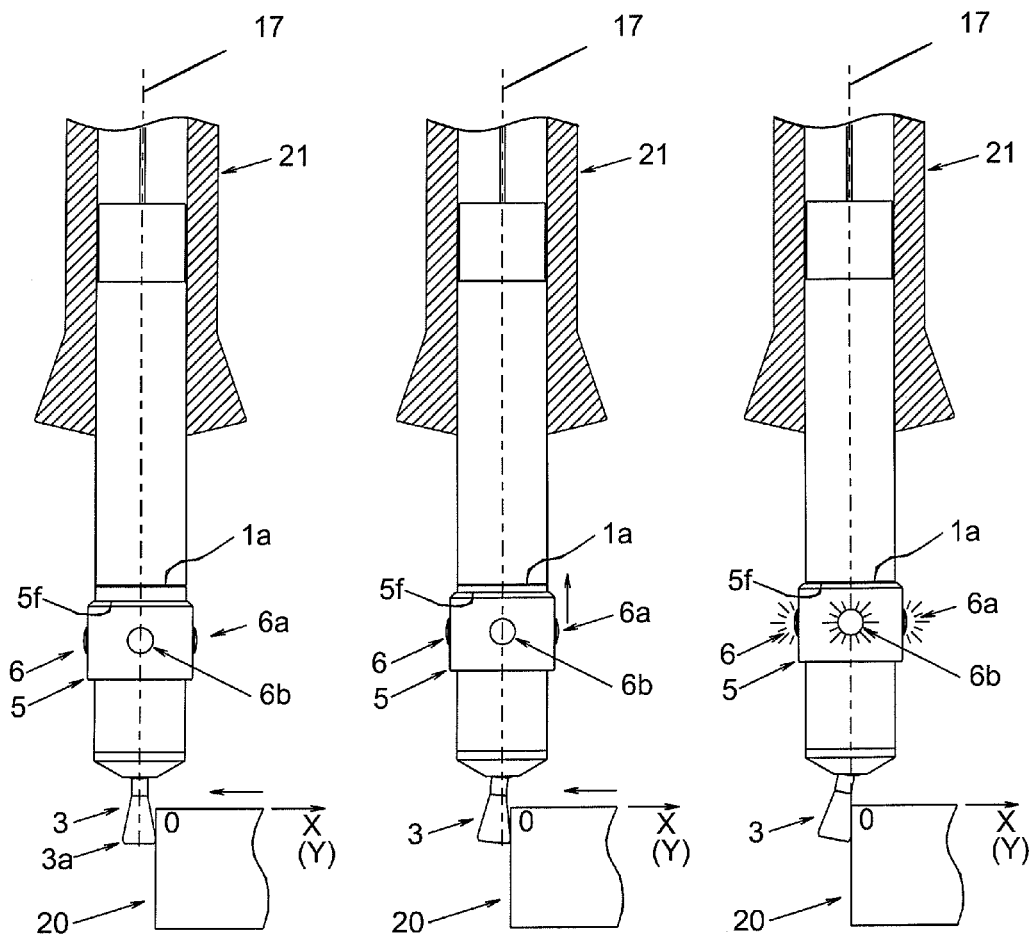
FIGS. 14a-c illustrate the edge finder upon engagement of the workpiece.
Figures 15A, 15B, 15C:
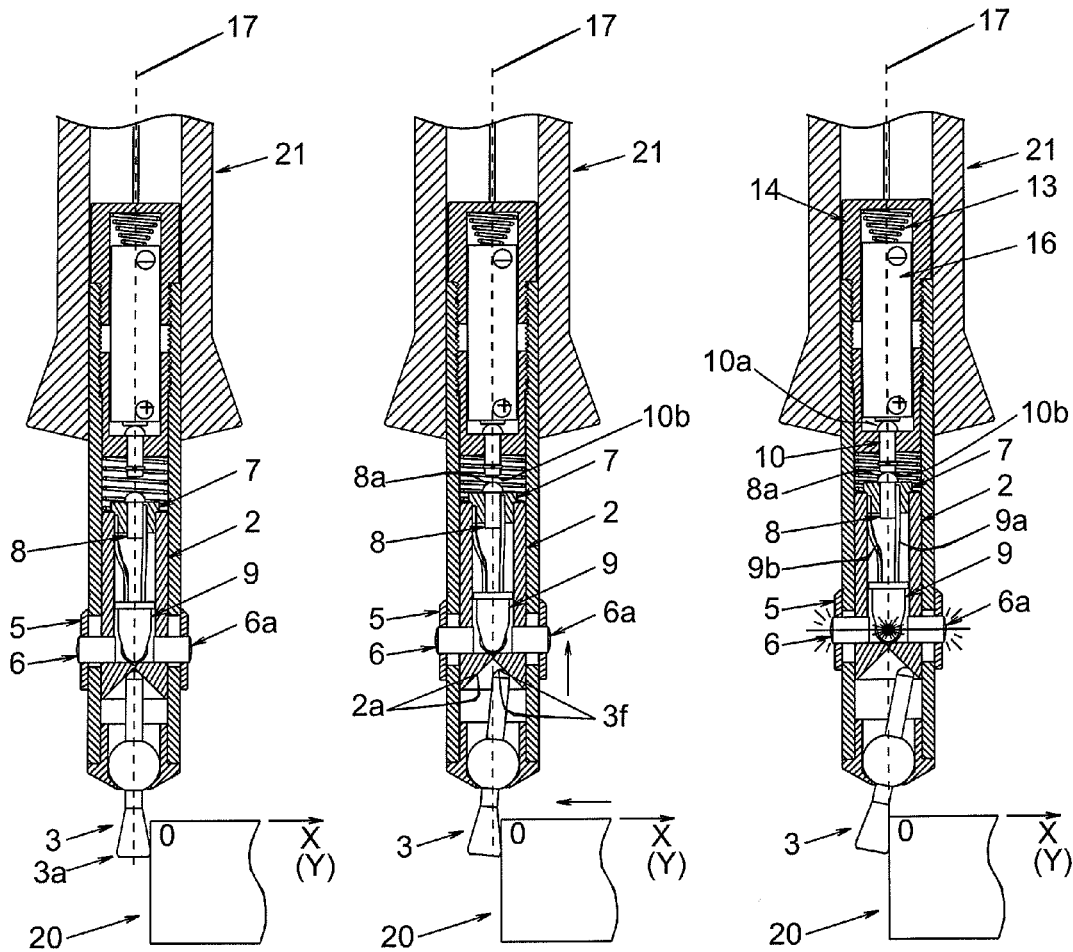
FIGS. 15a-15c illustrate cross-sections of the edge finder and collet upon engagement of a workpiece.

When finding the Edge 0Y of workpiece 20, the edge finder's top section is secured into collet 21, as shown in FIG. 14a, FIG. 14b, FIG. 14c, as well as FIG. 15a, FIG. 15b, and FIG. 15c. Workpiece 20 is moved toward probe 3 of the edge finder, following the direction of 0X, touching the rounded surface 3c of probe 3, and workpiece 20 moves toward the central axis 17 of the edge finder. This engagement provides pressure against the probe that is perpendicular to the central axis 17 of the edge finder and its housing. Because of this, probe 3 rotates about the center of ball-shaped portion 3a, which is located within the cone-shaped portion 4a of housing 4. This results in the half-spherical portion 3f of probe 3 rotating about the center of ball portion 3a.

Figure 13A:
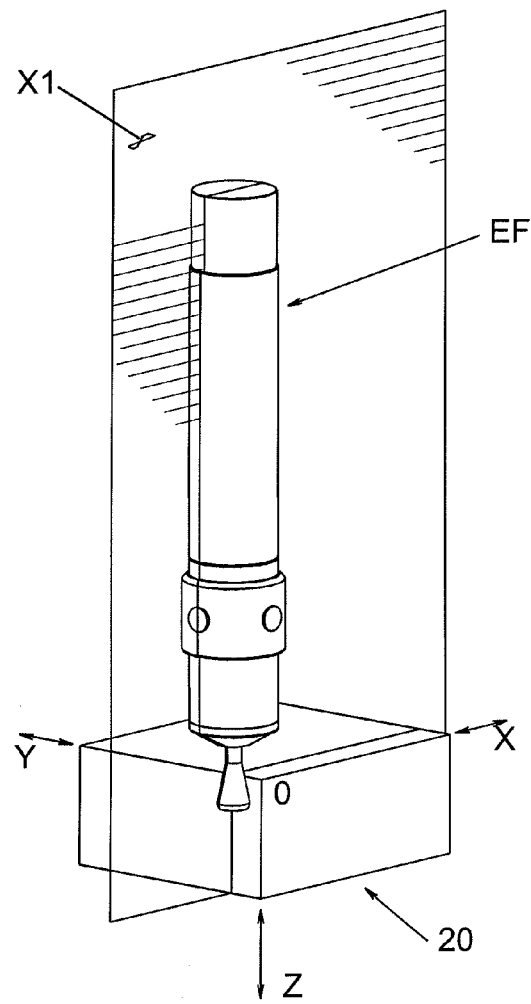
FIG. 13a illustrates the edge finder, workpiece and plane X1 from an isometric perspective view during the edge finding process for edge 0Y.

The cone-shaped opening 2a of piston 2, while pushing probe 3 downwards, leads the half-spherical portion 3f of probe 3 to follow the longest-possible path allowing the rotation of probe 3 only within the plane X1 shown in FIG. 13a. This plane X1 is perpendicular with edge 0Y of workpiece 20, and runs through the central axis 17 of the edge finder.

During this rotation of probe 3, half-spherical 3f is in contact with cone-shaped opening 2a of piston 2, and thus lifts piston 2 along with semi-transparent lenses 6, 6a, 6b, 6c, visual ring 5, LED light 9, plug 7, and contact pin 8. When the edge 0Y of workpiece 20 is in line with the central axis 17 of the edge finder, then surface 8a of contact pin 8 touches surface 10b of contact pin 10 closing the electrical loop. LED light 9 lights up and the light passes through the semi-transparent lenses 6, 6a, 6b, 6c, giving the machine worker/operator a signal that edge 0Y of workpiece 20 is in line with central axis 17 of the edge finder, i.e. that the edge 0Y has been located. The illumination of the LED light is illustrated in FIG. 14c and FIG. 15c.

When finding the edge 0X of workpiece 20, a similar process to finding edge 0Y of workpiece 20 is required, as shown in FIG. 14a, FIG. 14b, FIG. 14c, as well as FIG. 15a, FIG. 15b, and FIG. 15c. In this case, workpiece 20 is moved toward probe 3 of the edge finder, following the direction of 0Y, touching the rounded surface 3c of probe 3, and workpiece 20 moves toward the central axis 17 of the edge finder. Because of this, probe 3 rotates about the center of ball-shaped 3a, which is located within cone-shaped 4a of housing 4. This results in the half-spherical 3f of probe 3 rotating about the center of ball-shaped 3a of probe 3.

Figure 13B:
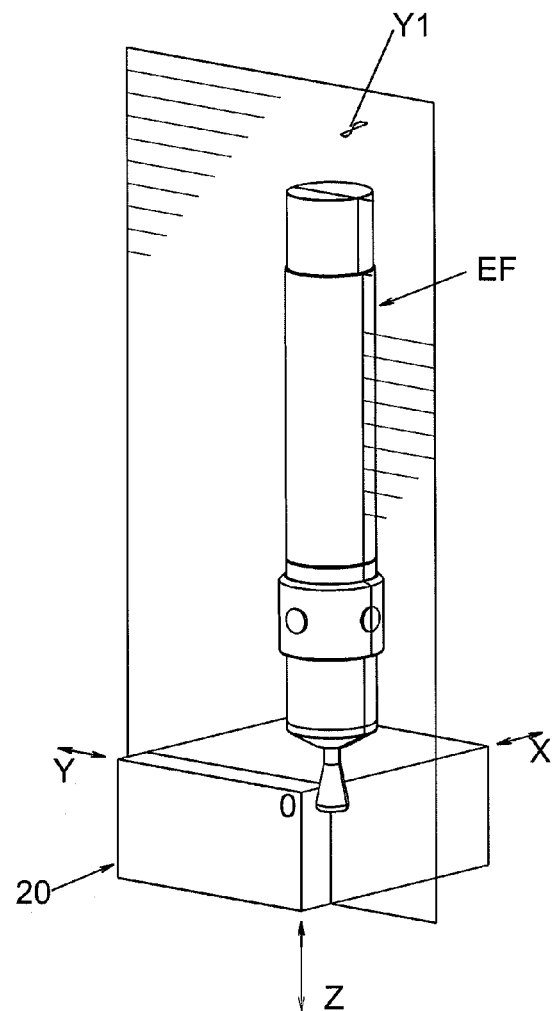
FIG. 13b illustrates the edge finder, workpiece and plane Y1 from an isometric perspective view during the edge finding process for edge 0X.

Cone-shaped opening 2a of piston 2, while pushing the probe 3 downwards, leads the half-spherical portion 3f of probe 3 to follow the longest-possible path allowing the rotation of probe 3 only within the plane Y1 shown in FIG. 13b. This plane Y1 is perpendicular with edge 0X of workpiece 20, and runs through the central axis 17 of the edge Finder.

During this rotation of the probe 3, the half-spherical portion 3f is in contact with cone-shaped opening 2a of piston 2, and thus lifts piston 2 along with semi-transparent lenses 6, 6a, 6b, 6c, visual ring 5, the LED light 9, plug 7, and the contact pin 8. When the edge 0X of workpiece 20 is in line with the central axis 17 of the edge finder, then surface 8a of the contact pin 8 touches the surface 10b of contact pin 10 closing the electrical loop. With the loop closed, the LED light 9 lights up and the light passes through the semi-transparent lenses 6, 6a, 6b, 6c, giving the machine worker/operator a signal that edge 0X of workpiece 20 is in line with central axis 17 of the edge finder, i.e. that the edge 0X has been located, as illustrated in FIG. 14c and FIG. 15c.

The closed electrical loop, consisting of the negative pole of battery 16, cone-shaped spring 13, cap 14, cylinder 1, piston 2, negative Pole 9a, LED light 9, positive pole 9a, contact pin 8, contact pin 10, and the positive pole of battery 16, is independent. Therein, the electrical loop does not depend on workpiece 20 being manufactured from an electro-conductive material, as shown in FIG. 2. Thus finding edge 0Y or 0X of workpiece 20 with the edge finder does not depend on workpiece 20 being manufactured from an electro-conductive material.

Throughout this edge-finding process, edge 5f of visual ring 5 moves closer to permanent line 1a of cylinder 1. This gives a visual cue to the machine worker/operator that as edge 5f of visual ring 5 moves closer permanent line 1a of cylinder 1, the movement of workpiece 20 should be gradually slowed and stopped when the LED light 9 lights up and the light passes through the semi-transparent lenses 6, 6a, 6b, 6c, at which point the edge 0Y or edge 0X of workpiece 20 is found. This process maximizes precision. In this way, the edge 0Y or edge 0X of workpiece 20 are found without strain or damage to the edge finder itself or any of its components, or for that matter strain on the material having its edge determined. This is illustrated in FIG. 14a, FIG. 14b, FIG. 14c, and in FIG. 15a, FIG. 15b, and FIG. 15c.

The current edge finder, by using the illumination of the light provides a unique design that assures an edge-finding process that is 100% repeatable. This unique design gives the machine worker/operator two signals that the edge is found: (1.) through the lighting of LED light 9 and the passing of that light through semi-transparent lenses 6, 6a, 6b, 6c; (2.) through the alignment of edge 5f of visual ring 5 with the permanent line 1a of cylinder 1.

Figures 16A, 16B, 16C:
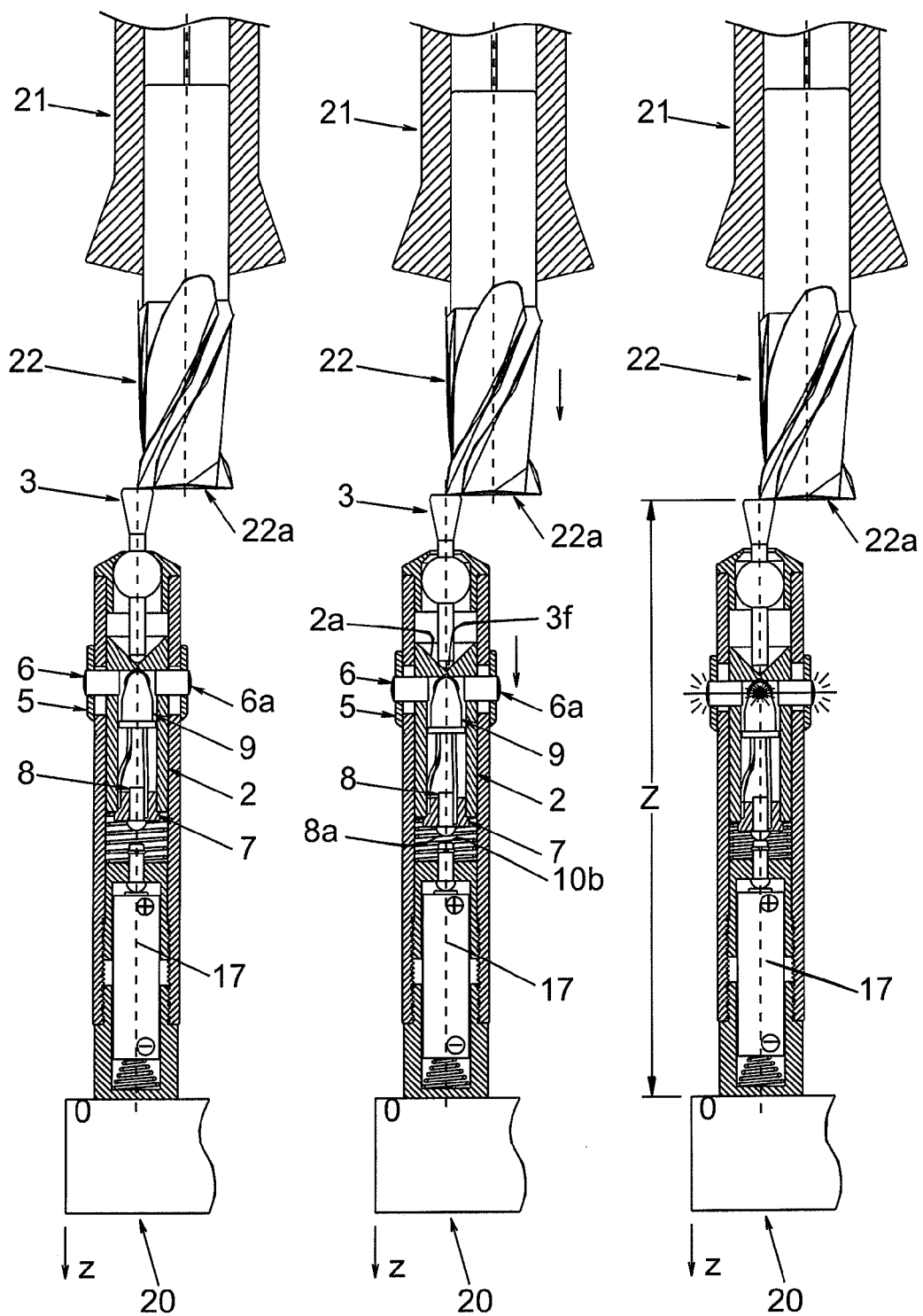
FIGS. 16a-16c illustrate cross-sections of the edge finder and collet upon engagement of a workpiece for Z-axis determination.

This unique design of the edge finder assures the simple and exact edge-finding of edges 0Y or 0X of workpiece 20 without any rotation of the edge finder. The edge finder is further usable for determining the Z edge. In one embodiment, the process to finding the Z edge works with straightedged standard, prefabricated workpieces. In the preferred embodiment, the edge Z (plane 0XY) of the workpiece is perpendicular to the tool When adjusting tool 22 into a vertical direction in relation to workpiece 20, the edge finder is placed upon workpiece 20 as shown in FIG. 16a, FIG. 16b, and FIG. 16c. In this embodiment, the short/flat part of the edge finder touches the workpiece and the probe 3 points upwards toward the tool. In this case, probe 3 is turned upwards toward tool 22. The tool, that can be a drill, a cutter, an endmill, or any other suitable type of tool that is used to work with materials on a CNC machine, drilling machine, or other type of machine, is slowly lowered, pushing down probe 3. This alignment provides pressure against the probe 3 that is parallel to the central axis 17 of edge finder and its housing.

As tool 22 is moved downwards toward the edge finder and workpiece 20, the bottom surface 22a of tool 22 presses flat-shaped surface 3d of probe 3 and thus pushes probe 3 and piston 2 along with semi-transparent lenses 6, 6a, 6b, 6c, visual ring 5, LED light 9, plug 7, and contact pin 8 towards contact pin 10. When surface 8a of contact pin 8 touches surface 10b of contact pin 10, the electrical loop is closed. LED light 9 is lit and the light passes through semi-transparent lenses 6, 6a, 6b, 6c, giving the machine worker/operator a signal. When the signal is given, e.g. in this embodiment, the light turning on, the machine operator marks that point as some point X.

In addition, edge 5f of visual ring 5 is aligned with the permanent line 1a of cylinder 1. These two signals give the worker/operator notice that bottom surface 22a of tool 22 is distance Z from workpiece 20, as shown in FIG. 16c.

The design of the edge finder enables the central axis of 3g of probe 3, along with the central axis of 2h of piston 2, along with the central axis of 1i of cylinder 1, to remain in co-linear position throughout this process. This provides precision and repeat-ability of the process of finding distance Z.

Throughout this distance Z finding process, edge 5f of visual ring 5 moves closer to permanent line 1a of cylinder 1. This gives a visual cue to the machine worker/operator that as edge 5f of visual ring 5 moves closer permanent line 1a of cylinder 1, the movement of tool 22 towards probe 3 should be slowed and stopped when LED light 9 lights up and the light passes through the semi-transparent lenses 6, 6a, 6b, 6c. This process maximizes precision. In this way, the distance Z is found without strain or damage. This provides precision and repeat-ability of the process of finding distance Z, i.e. indirectly finding plane 0XY.

It is recognized that in one embodiment, while determining the Z-axis, the tool is not yet touching the workpiece since the edge finder is located between the tool and the workpiece. Therefore, in this embodiment, the edge finder has a standard distance Z, documented for the user, wherein the distance Z is the distance between the tool and edge Z when the light is lit up. To find the edge Z, the operator will need to remove the edge finder, and add distance Z to point X—so this indirectly but precisely finds that third vertical edge Z.

As described herein, the present edge finder accurately and repeatedly finds the true edge of the workpiece without damaging the workpiece. Moreover, additional embodiments are envisioned herein, including any number of visible portions for seeing a light source, including more or less number of openings or spaces or may include a transparent continuous translucent ring. Other embodiments may include the removal of any translucent covers, thus exposing the light element directly. Moreover, additional embodiments may include audio notification instead of or in conjunction with the light, such as the light source including an additional noise generation element that generates a noise when the probe 3 is effectively rotated.

In another embodiment, notification may include the communication with an external computing device, such as for example using wired or wireless communication. By way of example, the notification element can generate a wireless signal to a remotely located receiver providing an indication that an electrical connection has been made. In one example, the signal can be a mere acknowledgement signal for a remote computing device to generate an output signal, such as generating an output on a display screen, activating a light or audible indicator, etc. In another embodiment, the notification may be transmitted to a computing device that works in conjunction with the edge finder operator to designate a specific location via external measurements. While one embodiment may include a wireless transmitter, it is recognized that another embodiment may include a wired connection via the collet 21

FIGS. 1 through 16c are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. An apparatus for finding an edge of an item, the apparatus comprising:
   a housing having a power source associated therewith;
   a probe extending outward from a bottom portion of the housing, the probe including a tip portion located at a distal end, a centrally-disposed spherical portion, and a columnar portion located at a proximal end;
   a notification element disposed within the housing, the notification element including the ability to be engaged via the power source; and
   a contact element disposed within the housing such that when pressure is applied to the tip portion such pressure rotates the centrally-disposed spherical portion so the columnar portion translates the pressure applied to the tip portion to an engagement surface causing the contact element to engage with the power source for activating the notification element, thereby determining a planar edge of the item along at least one of the X axis, the Y axis and the Z axis.

2. The apparatus of claim 1, wherein the tip portion has a conical shape and the engagement surface is a cone-shaped surface.

3. The apparatus of claim 1 further comprising:
a spring member disposed between the notification element and the power source such that
the contact on the engagement surface forces the compression of the spring member for engagement of the contact element with the power source for determining at least one of the X axis and the Y axis of the item.

4. The apparatus of claim 3, wherein when a pressure parallel to the central axis of the housing is applied to the tip portion, the columnar portion contacts the engagement surface forcing the compression of the spring member for determining the Z axis of the item.

5. The apparatus of claim 1 wherein the notification element is a light source, the apparatus further comprising:
a piston disposed within the housing, the piston including a plurality of apertures such that the light source is visible through the apertures, the piston displaceable within the housing based on force applied from the columnar portion of the probe.

6. The apparatus of claim 5 further comprising: for each of the plurality of apertures, a transparent lens disposed therein.

7. The apparatus of claim 1 wherein the notification element is a sound emitting device.

8. The apparatus of claim 1 wherein the notification element is a communication device for communication with a remote computer.

9. The apparatus of claim 1 further comprising:
a cap disposed at a top portion of the housing for secure engagement of the power source within the housing such that the power source is removeable upon removal of the cap from the housing.

10. An apparatus for finding an edge of an item, the apparatus comprising:
a housing having a power source associated therewith;
a probe extending outward from a bottom portion of the housing, the probe including a tip portion located at a distal end, a centrally-disposed spherical portion, and a columnar portion located at a proximal end;
a notification element disposed within the housing, the notification element including the ability to be engaged via the power source;
a spring member disposed between the notification element and the power source;
an engagement surface disposed between the notification element and the probe, wherein the engagement surface is a angled surface; and
a contact element disposed within the housing such that when pressure is applied to the tip portion, tip portion rotates about the centrally-disposed spherical portion so the columnar portion translates the pressure applied to the tip portion to the engagement surface which then provides for the compression of the spring member allowing the contact element to engage the power source for activating the notification element, thereby determining a planar edge of the item along at least one of the X axis, the Y axis and the Z axis.

11. The apparatus of claim 10, wherein the tip portion has a conical shape.

12. The apparatus of claim 10, wherein the angled surface of engagement surface is a cone-shaped surface.

13. The apparatus of claim 12, wherein when a pressure parallel to the central axis of the housing is applied to the tip portion, the columnar portion contacts the engagement surface forcing the compression of the spring member for determining the Z axis of the item.

14. The apparatus of claim 10 wherein the notification element is a light source, the apparatus further comprising:
a piston disposed within the housing, the piston including a plurality of apertures such that the light source is visible through the apertures, the piston displaceable within the housing based on force applied from the columnar portion of the probe.

15. The apparatus of claim 14 further comprising:
for each of the plurality of apertures, a transparent lens disposed therein.

16. The apparatus of claim 10 wherein the notification element is a sound emitting device.

17. The apparatus of claim 10 wherein the notification element is a communication device for communication with a remote computer.

18. An apparatus for finding an edge of an item, the apparatus comprising:
a housing having a power source encapsulated therein;
a cap disposed at a top portion of the housing for secure engagement of the power source within the housing such that the power source is removeable upon removal of the cap from the housing;
a probe extending outward from a bottom portion of the housing, the probe including a tip portion located at a distal end, a centrally-disposed spherical portion, and a columnar portion located at a proximal end;
a light-source notification element disposed within the housing, the notification element including the ability to be engaged via the power source;
a piston disposed within the housing, the piston including a plurality of apertures such that the light source is visible through the apertures; a spring member disposed between the notification element and the power source;
an engagement surface disposed between the notification element and the probe, wherein the engagement surface is a cone-shaped surface; and
a contact element disposed within the housing such that when pressure is applied to the tip portion, tip portion rotates about the centrally-disposed spherical portion so the columnar portion translates the pressure applied to the tip portion to the engagement surface which then provides for the compression of the spring member allowing the contact element to engage the power source for activating the notification element, thereby determining a planar edge of the item along at least one of the X axis, the Y axis and the Z axis;
wherein when a pressure perpendicular to a central axis of the housing is applied to the tip portion, the probe rotates about the spherical portion and the columnar portion contacts the engagement surface, the contact on the engagement surface displaces the piston with housing and forces the compression of the spring member for engagement of the contact element with the power source for determining at least one of the X axis and the Y axis of the item;
wherein when a pressure parallel to the central axis of the housing is applied to the tip portion, the columnar portion contacts the engagement surface displaces the piston with housing and forcing the compression of the spring member for determining the Z axis of the item.

19. The apparatus of claim 18, wherein the tip portion has a conical shape.

20. The apparatus of claim 18 further comprising: for each of the plurality of apertures, a transparent lens disposed therein.

* * * * *